United States Patent [19]
Dexter et al.

[11] 3,723,503
[45] Mar. 27, 1973

[54] 3,5-DIALKYL-4-HYDROXYPHENYLALKANOIC ACID ESTERS OF 3-HYDROXY-2,2-DIMETHYLPROPYL 3-HYDROXY-2,2-DIMETHYLPROPIONATE

[75] Inventors: Martin Dexter, Briarcliff Manor; John D. Spivack, Spring Valley; David Herbert Steinbeg, Bronx, all of N.Y.

[73] Assignee: Ciba-Geigy Corporation, Ardsley, N.Y.

[22] Filed: July 1, 1971

[21] Appl. No.: 159,021

[52] U.S. Cl. ................260/473 S, 44/70, 99/163, 260/45.85
[51] Int. Cl. .................................C07c 69/76
[58] Field of Search...........................260/473 S

[56] References Cited

UNITED STATES PATENTS 3,441,575   4/1969   Dexter et al. ................260/473 S Primary Examiner—Henry R. Jiles
Assistant Examiner—John F. Terapane
Attorney—Karl F. Jorda et al.

[57] ABSTRACT

Esters of 3-hydroxy-2,2-dimethylpropyl 3-hydroxy-2,2-dimethylpropionate with 3,5-dialkyl-4-hydroxyphenylalkanoic acids are stabilizers of organic material. The compounds of which 3-hydroxy-2,2-dimethylpropyl-(3-hydroxy-2,2-dimethylpropionate)-bis[3-(3',5'-di-t-butyl-4'-hydroxyphenyl)propionate] is a typical embodiment, are prepared through esterification of 3-hydroxy-2,2-dimethylpropyl-3-hydroxy-2,2-dimethylpropionate.

5 Claims, No Drawings

3,5-DIALKYL-4-HYDROXYPHENYLALKANOIC ACID ESTERS OF 3-HYDROXY-2,2-DIMETHYLPROPYL 3-HYDROXY-2,2-DIMETHYLPROPIONATE

This invention relates to 3,5-dialkyl-4-hydroxyphenylalkanoic acid esters of 3-hydroxy-2,2-dimethylpropyl 3-hydroxy-2,2-dimethylpropionate. The esters are useful as stabilizers of organic material which is otherwise subject to thermal, oxidative and/or actinic deterioration.

The compounds of the present invention are represented by the formula

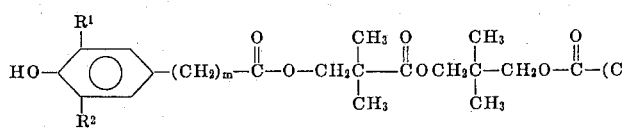

wherein
each of $R^1$ and $R^2$ is a (lower)alkyl group of from one to four carbon atoms;
$m$ is 1 or 2.

In the compounds depicted by formula I, each of $R^1$ and $R^2$ is the same or different (lower)alkyl groups of from one to four carbon atoms, namely, methyl, ethyl, n-propyl, isopropyl, n-butyl, secondary-butyl, isobutyl or tertiary butyl.

The compounds in this invention can be prepared through esterification of 3-hydroxy-2,2-dimethylpropyl 3-hydroxy-2,2-dimethylpropionate with a dialkyl-4-hydroxyphenylalkanoic acid derivative of the formula

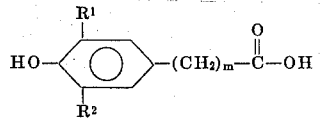

wherein $R^1$ and $R^2$ are as previously defined. This derivative can be either the free acid, an acid halide thereof such as the acid chloride or acid bromide, or an acid anhydride thereof. When the free acid is employed, the esterification is preferably conducted in an inert non-aqueous organic solvent in the presence of an acid catalyst. An inert, non-aqueous organic solvent is also preferably employed when the acid halide or anhydride is utilized, together with an acid acceptor such as pyridine or triethylamine.

The 3,5-dialkyl-4-hydroxyphenylalkanoic acid derivatives of 3-hydroxy-2,2-dimethylpropyl 3-hydroxy-2,2-dimethylpropionate are useful as stabilizers or organic materials normally subject to oxidative and thermal deterioration. Such organic materials include: synthetic organic polymeric substances such as vinyl resins formed from the polymerization of vinyl halides or from the copolymerization of vinyl halides with unsaturated polymerizable compounds, e.g., vinylesters, $\alpha,\beta$-unsaturated ketones, $\alpha,\beta$-unsaturated aldehydes and unsaturated hydrocarbons such as butadienes and styrene; poly-$\alpha$-olefins such as polyethylene, polypropylene, polybutylene, polyisoprene, and the like, including copolymers of poly-$\alpha$-olefins; polyurethanes and polyamides such as polyhexamethylene adipamide and polycaprolactam; polyesters such as polyethylene terephthalates; polycarbonates; polyacetals; polystyrene; polyethyleneoxide; and copolymers such as those of high impact polystyrene containing copolymers of butadiene and styrene and those formed by the copolymerization of acrylonitrile, butadiene and/or styrene.

Other materials which can be stabilized by the compounds of the present invention include lubricating oil of the aliphatic ester type, i.e., di (2-ethylhexyl) azelate, pentaerythritol tetracaproate, and the like; animal and vegetable derived oils, e.g., linseed oil, fat, tallow, lard, peanut oil, cod liver oil, castor oil, palm oil, corn oil, cottonseed oil, and the like; hydrocarbon materials such as gasoline, mineral oil, fuel oil, drying oil, cutting fluids, waxes, resins, and the like, salts of fatty acids such as soaps and the like.

In general, the stabilizers of this invention are employed from about 0.005 percent to about 10 percent by weight of the stabilized composition, although this will vary with the particular substrate and application. An advantageous range is from about 0.05 percent to about 5 percent and especially 0.05 percent to about 2 percent. These compounds are particularly useful for the stabilization of polyolefins such as polypropylene and polyethylene. They can be blended before polymerization or after polymerization during the usual processing operations, for example, by hot-milling the composition then being extruded, pressed, or the like into films, fibers, filaments, hollowspheres and the like. The heat stabilizing properties of these compounds advantageously stabilize the polymer against degradation during such processing at the high temperatures generally encountered. The stabilizers can also be dissolved in suitable solvents and sprayed on the surface of films, fabrics, filaments or the like to provide effective stabilization.

These compounds can also be used in combination with other additives such as antioxidants, sulfur-containing esters such as distearyl-$\beta$-thiodipropionate (DSTDP), dilauryl-$\beta$-thiodipropionate (DLTDP) in an amount of from 0.01 to 2 percent by weight of the organic material, and the like, pourpoint depressants, corrosion and rust inhibitors, dispersing agents, demulsifiers, antifoaming agents, carbon black, accelerators and other chemicals used in rubber compounding, plasticizers, color stabilizers, di- and tri-alkyl- and -alkylphenylphosphites, heat stabilizers, ultraviolet light stabilizers, dyes, pigments, metal chelating agents, dyesites and the like. Often combinations such as these, particularly the sulfur containing esters, the phosphites and/or the ultraviolet light stabilizers will produce superior results in certain applications to those expected by the properties of the individual components.

The following are presented to further illustrate the present invention without introducing any limitation thereto.

EXAMPLE 1

3-hydroxy-2,2-dimethylpropyl-(3-hydroxy-2,2-dimethylpropionate)-bis[3-(3',5'-di-t-butyl-4'-hydroxyphenyl)propionate]

A solution consisting of 3-hydroxy-2,2-dimethylpropyl 3-hydroxy-2,2-dimethylpropionate (7.98 g) in dried benzene (50 ml) and containing dry pyridine (6.33 g) was treated with a solution of 3-(3',5'-di-t-butyl-4'-hydroxyphenyl)propionyl chloride (27.9 g) in dried benzene (50 mil) over a 2 hour period at room temperature under nitrogen.

After stirring at ambient temperature of 25°C overnight, the mixture was filtered and the filtrate washed successively with water, 2M sodium hydroxide and saturated sodium chloride. The organic solution was dried over molecular sieves (Linde 4A) and passed through a bed of neutral alumina (1,026 g). The product fractions were combined, stripped of solvent and dried to constant weight at 125°C/0.1 mm pressure. The product was amorphous.

Analysis for $C_{44}H_{68}O_8$:

% Calculated: C, 72.89; H, 9.45
% Found: C, 72.84; H, 9.54.

EXAMPLE 2

In a similar fashion, the following acid chlorides are substituted in equivalent amounts for 3-(3',5'-di-t-butyl-4'-hydroxyphenylpropionyl)chloride by essentially the same procedure as in Example 1.

a. 3-(3'-methyl-5'-t-butyl-4'-hydroxyphenyl)propionyl chloride
b. 3-(3',5'-dimethyl-4'-hydroxyphenyl)propionyl)chloride
c. 3-methyl-5-t-butyl-4-hydroxyphenyl)acetyl chloride There are thus respectively obtained a. 3-hydroxy-2,2-dimethylpropyl-(3-hydroxy-2,2-dimethylpropionate)-bis[3-(3'-methyl-5'-t-butyl-4'-hydroxy)propimate]
b. 3-hydroxy-2,2-dimethylpropyl-(3-hydroxy-2,2-dimethylpropionate)-bis[3-(3',5'-dimethyl-4'-hydroxyphenyl)propionate]
c. 3-hydroxy-2,2-dimethylpropyl-(3-hydroxy-2,2-dimethylpropionate)-bis(3'-methyl-5'-t-butyl-4'-hydroxyphenyl)acetate.

EXAMPLE 3

Unstabilized polypropylene powder (Hercules Profax 6501) was thoroughly blended with 0.20 percent by weight of 3-hydroxy-2,2-dimethylpropyl-(3-hydroxy-2,2-dimethylpropionate)-bis[3-(3',5'-di-t-butyl-4'-hydroxyphenyl)propionate]. Also prepared was samples of polypropylene containing 0.1 percent by weight of the same stabilizer and 0.3 percent by weight of distearylthiodipropionate (DSTDP). bThe blended materials were then milled on a two-roll mill at 182°C for 10 minutes, after which time the stabilizer polypropylene was sheeted from the mill and allowed to cool.

The milled polypropylene sheets were then cut into pieces and pressed for 7 minutes on a hydraulic press at 218°C, 2,000 pounds per square inch pressure. The resulting sheet of 25 mil thickness were tested for resistance to accelerated aging in a forced draft oven at 150°C. The results are set out in Table I below:

TABLE I

| Additive (s) | Oven Aging at 150°C Hours to Failure |
|---|---|
| 0.2% of 3-hydroxy-2,2-dimethylpropyl-(3-hydroxy-2,2-dimethylpropionate)-bis [3-(3',5'-di-t-butyl-4'-hydroxyphenyl)propionate] | 640 |
| 0.1% of 3-hydroxy-2,2-dimethylpropyl-(3-hydroxy-2,2-dimethylpropionate)-bis [3-(3',5'-di-t-butyl-4'-hydroxyphenyl)propionate] + 0.3% DSTDP | 1250 |
| Unstabilized Polypropylene | 3 |
| 0.3% DSTDP* alone | <20 |

*distearylthiodipropionate (a synergist for phenolic antioxidants)

The above data clearly indicates the significant increase in the stabilization of polypropylene upon addition of the antioxidant of the present invention.

Stabilized polypropylene compositions are also obtained when 0.5 percent of 3-hydroxy-2,2-dimethylpropyl-(3-hydroxy-2,2-dimethylpropionate)-bis[3-(3',5'4'-hydroxyphenyl)-propionate] or 0.5 percent of 3-hydroxy-2,2-dimethylpropyl-(3-hydroxy-2,2-dimethylpropionate)-bis[3-(3'-methyl-5'-t-butyl-4'-hydroxyphenyl)propionate] are employed alone or in combination with DSTDP.

EXAMPLE 4

A water-white, refined (U.S.P. grade) mineral oil (Esso PRIMOL D) is stabilized and tested under the following test conditions.

A sample of the mineral oil (10 g) containing 0.1 percent by weight of 3-hydroxy-2,2-dimethylpropyl-(3-hydroxy-2,2-dimethyl-propionate)-bis(3'-methyl-5'-t-butyl-4'-hydroxyphenyl)-acetate] is placed in a Sligh type oxidation flask filled with oxygen at room temperature (25°C) and atmospheric pressure. Thereafter, the flask is sealed to form a system having a mercury manometer which measures the pressure changes as oxygen is absorbed by the sample in the flask. The sample is then heated at 150°C until the manometer registers a decrease of 300 mm Hg pressure within the flasks with reference to the maximum pressure obtained at 150°C. Results of this test show the increase oxidation resistance for the sample containing the stabilizer.

EXAMPLE 5

High impact polystyrene resin containing elastomer (i.e., butadiene-styrene) is stabilized against loss of elongation properties by incorporation of 0.1 percent by weight of 3-hydroxy-2,2-dimethylpropyl-(3-hydroxy-2,2-dimethylpropionate)-bis[3-(3',5'-di-t-butyl-4'-hydroxyphenyl)propionate]. Under the test conditions described below, the stabilized resin retains a higher percentage of its original elongation properties, whereas the unstabilized resin retains less elongation properties. A substantial improvement in stability is also noted when only 0.05 percent of the stabilizer is employed.

The unstabilized resin is dissolved in chloroform and the stabilizer then added, after which the mixture is cast on a glass plate and the solvent evaporated to yield a uniform film which, upon drying, is removed and cut up, and then pressed for 7 minutes at a temperature of 163°C and a pressure of 2,000 pounds per square inch into a sheet of uniform thickness (25 mil). The sheets are then cut into strips, approximately 4 X 0.5 inches. A portion of these strips is then measured for length of elongation in the Instron Tensile tester (Instron Engineering Corporation, Quincy Mass). The remaining portion of the strips is aged in a forced draft oven for 6 weeks at 75°C and thereafter tested for elongation. The stabilized polystyrene resin has retained its elongation property much better than the unstabilized resin.

EXAMPLE 6

A quantity of SBR emulsion containing 100 g of rubber (500 ml of 20% SBR obtained from Texas U.S., Synpol 1500) previously stored under nitrogen, is place in a beaker and stirred vigorously. The pH of the emulsion is adjusted to 10.5 with a 0.5N NaOH solution.

To the emulsion is added 50 ml of 25% NaCl solution. A 6% NaCl solution adjusted with hydrochloric acid to a pH 1.5 is added in a thin stream with vigorous stirring. When pH 6.5 is reached, the rubber begins to coagulate and the addition is slowed down in order to maintain uniform agitation. The addition of the acidic 6% NaCl solution is terminated when a pH 3.5 is reached. The coagulated crumb-rubber slurry at pH 3.5 is stirred for one-half hour.

The coagulated rubber is isolated by filtration through cheese cloth, and rinsed with distilled water. After three subsequent washings with fresh distilled water, the coagulated rubber is dried, first at 25 mm Hg and finally to constant weight under high vacuum (<1 mm) at 40°–45°C.

The dried rubber (25 g) is heated under nitrogen at 125°C in a Brabender mixer and to this is added with mixing 1.25 g (0.5%) of 3-hydroxy-2,2-dimethylpropyl-(3-hydroxy-2,2-dimethylpropionate)-bis[3-(3',5'-di-t-butyl-4'-hydroxyphenyl)-propainate]. The composition is mixed for 5 minutes after which it is cooled and compression molded at 125°C into 5 × 5 × 0.025 inch plaques.

The plaques are placed on aluminum sheets and heated in a circulating air oven at 100°C for up to 96 hours. The viscosity of a 0.5 percent toluene solution of aged and unaged rubber samples are determined at 25°C. Stabilizer effectiveness is judged by the percent retention of specific viscosity, color formation and gel content after oven aging. The stabilized rubber has better viscosity, color retention, and less gel content than the rubber which is unstabilized after oven aging.

Similar results are obtained when 3-hydroxy-2,2-dimethyl-propyl-(3-hydroxy-2,2-dimethylpropionate)-bis[3'-methyl-5'-t-butyl-4'-hydroxyphenyl)propionate] or the corresponding acetate derivative is used in place of the above mentioned stabilizer in the rubber composition.

EXAMPLE 7

To 50 g of polyacetal resin containing 0.1 percent of an acid scavenger dicyandiamide is added 0.5 percent of 3-hydroxy-2,2-dimethylpropyl-(3-hydroxy-2,2-dimethylpropionate)-bis[3-(3',5'-di-t-butyl-4'-hydroxyphenyl)propionate]. The resin containing this additive is milled for 7 minutes at resistence 200°C in a Brabender Plasti-recorder. The milled formulation is subsequently pressed into a 40 mil sheet at 215°C at 350 psi for 90 seconds then cooled quickly in a cold press at 350 psi. The stabilized sheets are then remolded for 2 minutes at contact pressure and for 3 minutes at 300 psi at 215°C to give plaques 1½ inch × 2¼ inch × 125 mil. The resulting plaques are tested for resistance to accelerated aging in a force draft oven at 140°C. Unstabilized samples of polyacetal containing only dicyandiamide are tested in the same manner and the results show that the composition containing the above triazine compound is substantially more stable than the unstabilized composition.

EXAMPLE 8

A composition is prepared comprising linear polyethylene and 1.0 percent by weight of 3-hydroxy-2,2-dimethylpropyl-(3-hydroxy-2,2-dimethylpropionate)-bis(3'-methyl-5'-t-butyl-4'-hydroxyphenyl)acetate]. The composition is injected molded into tensile bars which are placed in a circulating air oven at 120°C. In contrast to those molded from unstabilized linear polyethylene, tensile bars molded from the instant composition retained its tensile strength for a substantially longer period.

EXAMPLE 9

Cyclohexene, freshly distilled is stabilized by the addition thereto of 0.05 percent by weight of 3-hydroxy-2,2-dimethylpropyl-(3-hydroxy-2,2-dimethylpropionate)-bis[3-(3'-methyl-5'-t-butyl-4'-hydroxyphenyl)propionate]. The effectiveness of this stabilizer in cyclohexene is tested by the ASTM D 525–55 oxidation test. The unstabilized cyclohexene fails in shorter time as compared to the stabilized cyclohexene.

EXAMPLE 10

A stabilized high temperature lubricating oil is prepared by incorporating 2 percent by weight of 3-hydroxy-2,2-dimethylpropyl-(3-hydroxy-2,2-dimethylpropionate)-bis[3-(3',5'-di-t-butyl-4'-hydroxyphenyl)propionate] to the lubricant which comprises diisoamyladipate. The stabilized composition is compared with the unstabilized lubricant by heating at 175° in the presence of air and metallic catalysts according to the test method described in Military Specification Mil–I–808c. After 72 hours, the blank containing no stabilizer contains more sludge and has a greater viscosity than the stabilized lubricant.

What is claimed is:

1. A compound of the formula

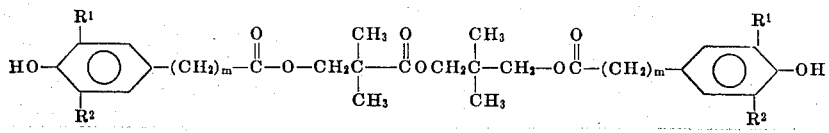

wherein
each of $R^1$ and $R^2$ is a (lower)alkyl group of from one to four carbon atoms;
$m$ is 1 or 2.

2. The compound according to claim 1 wherein each of $R^1$ and $R^2$ is t-butyl or methyl.

3. The compound according to claim 2 which is 3-hydroxy-2,2-dimethylpropyl-(3-hydroxy-2,2-dimethylpropionate)-bis[3-(3',5'-di-t-butyl-4'-hydroxyphenyl)propionate].

4. The compound according to claim 2 which is 3-hydroxy-2,2-dimethylpropyl-(3-hydroxy-2,2-dimethylpropionate)-bis[3-(3'-methyl-5'-t-butyl-4'-hydroxyphenyl)prioionate].

5. The compound according to claim 2 which is 3-hydroxy-2,2-dimethylpropyl-(3-hydroxy-2,2-dimethylpropionate)-bis(3'-methyl-5'-t-butyl-4'-hydroxyphenyl)acetate.

* * * * *